United States Patent [19]

Wrobel

[11] Patent Number: 4,592,317

[45] Date of Patent: Jun. 3, 1986

[54] MOTOR VEHICLE THEFT DETERRENT DEVICE

[75] Inventor: Albert A. Wrobel, Wayne, Mich.

[73] Assignee: Benjamin Brant, West Bloomfield, Mich. ; a part interest

[21] Appl. No.: 717,136

[22] Filed: Mar. 28, 1985

[51] Int. Cl.[4] .............................................. B60R 25/04
[52] U.S. Cl. .......................... 123/198 B; 123/198 A; 307/10 AT; 116/33; 180/287; 340/63
[58] Field of Search ........................ 123/198 B, 198 A; 180/287; 307/10 AT; 340/63, 64, 105; 116/33, 214, 264

[56] References Cited

U.S. PATENT DOCUMENTS

| 1,522,438 | 1/1925 | Goodspeed | 116/33 |
|---|---|---|---|
| 1,632,576 | 6/1927 | Alfisi | 70/243 |
| 2,229,063 | 1/1941 | Field | 123/198 A |
| 2,972,342 | 2/1961 | Owen | 123/198 A |
| 3,092,827 | 6/1963 | Pearce | 116/214 |
| 3,539,988 | 4/1967 | Humphress | 307/10 AT |
| 3,720,284 | 3/1973 | Myers | 123/198 B |
| 3,748,494 | 7/1973 | Nine | 307/10 AT |
| 3,967,239 | 6/1976 | Steele | 307/10 AT |
| 4,071,007 | 1/1978 | Arix | 123/198 B |
| 4,175,635 | 11/1979 | Thomas | 307/10 AT |
| 4,300,495 | 11/1981 | Trevino et al. | 123/198 B |
| 4,452,197 | 6/1984 | Weber | 123/198 B |

FOREIGN PATENT DOCUMENTS 2478854  9/1981  France ................................. 116/33

Primary Examiner—Ira S. Lazarus
Attorney, Agent, or Firm—Hauke & Patalidis

[57] ABSTRACT

A motor vehicle theft deterrent device comprising a supply of oil or other oily fluid introduced into the motor vehicle engine intake through one of the engine suction lines upon operation of the engine while a hidden switch is closed and turns on a valve disposed in the line connecting a reservoir containing the oil or oily fluid to the engine intake. The excess oil or oily fluid being ingested by the engine causes a telltale cloud of smoke at the exhaust and causes malfunction of the engine.

16 Claims, 2 Drawing Figures

MOTOR VEHICLE THEFT DETERRENT DEVICE

BACKGROUND OF THE INVENTION

The present invention relates to motor vehicle anti-theft devices in general, and more particularly to a motor vehicle theft deterrent device providing a visual distress signal accompanied by poor operation of a stolen motor vehicle.

Protecting motor vehicles against theft has generally been accomplished in the past by means of, for example, combination door locks, hidden ignition inhibiting switches, hidden fuel shut-off valves, and the like, discouraging the starting and unauthorized operation of the motor vehicle engine. Other means have also been used in the past to attract attention upon unauthorized operation of a motor vehicle, such as door switches which, upon unauthorized opening of the door, operate, generally intermittently, the horn and/or the headlights of the vehicle, sometimes accompanied by the activation of a separate alarm horn of high intensity.

Other devices have been also designed for permitting limited operation of a motor vehicle by unauthorized operators, but nevertheless discouraging continuous operation of the vehicle, such as for example the vehicle anti-theft foiling device disclosed in U.S. Pat. No. 4,452,197 which permits the vehicle engine to start in an apparently normal manner and operate normally for a brief period of time. After the vehicle has been driven for a short period of time, the ignition system becomes irregularly interrupted, thus simulating malfunction of the engine which serves to discourage the unlawful operator from continuing with the attempted theft.

SUMMARY OF THE INVENTION

The present invention provides a motor vehicle theft deterrent device which permits normal startup of the engine by an unauthorized operator but which, as soon as the engine has been started, provides a telltale signal of unauthorized use which, in addition to attracting attention upon the motor vehicle, eventually causes malfunction of the engine, without damaging the engine. The telltale signal takes the form of heavy smoke which, for emphatic effect, can be colored and, if so desired, the telltale signal and the malfunction of the engine may be coupled with other theft deterrent arrangements such as intermittent blowing of the horn, for example, or intermittent operation of the headlights.

The many objects and advantages of the invention will become apparent to those skilled in the art when the following description of the best mode contemplated at the present for practicing the invention is read in conjunction with the accompanying drawing, wherein:

DETAILED DESCRIPTION OF THE PREFERRED EMBODIMENTS

Figure 1:
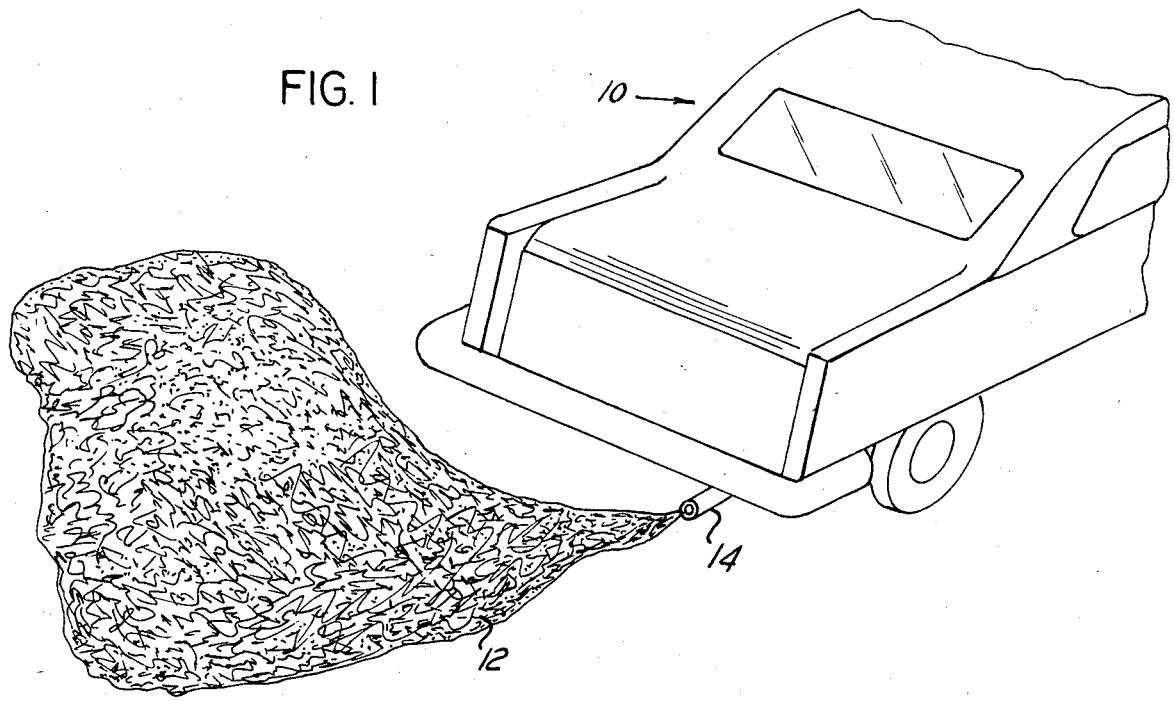
FIG. 1 is a schematic representation of the rear end portion of a motor vehicle with a heavy smoke cloud being ejected from the tailpipe to provide a telltale signal according to the present invention.

As illustrated at FIG. 1, a motor vehicle 10 provided with a motor vehicle theft deterrent device according to the present invention, emits a strong telltale signal in the form of heavy smoke 12 being exhausted from the tailpipe 14 upon unauthorized operation of the motor vehicle. The smoke 12 is simply heavy black smoke and, in addition, the smoke may be colored in red, orange, or any other color, by way of appropriate chemicals, as will be explained hereinafter.

Figure 2:
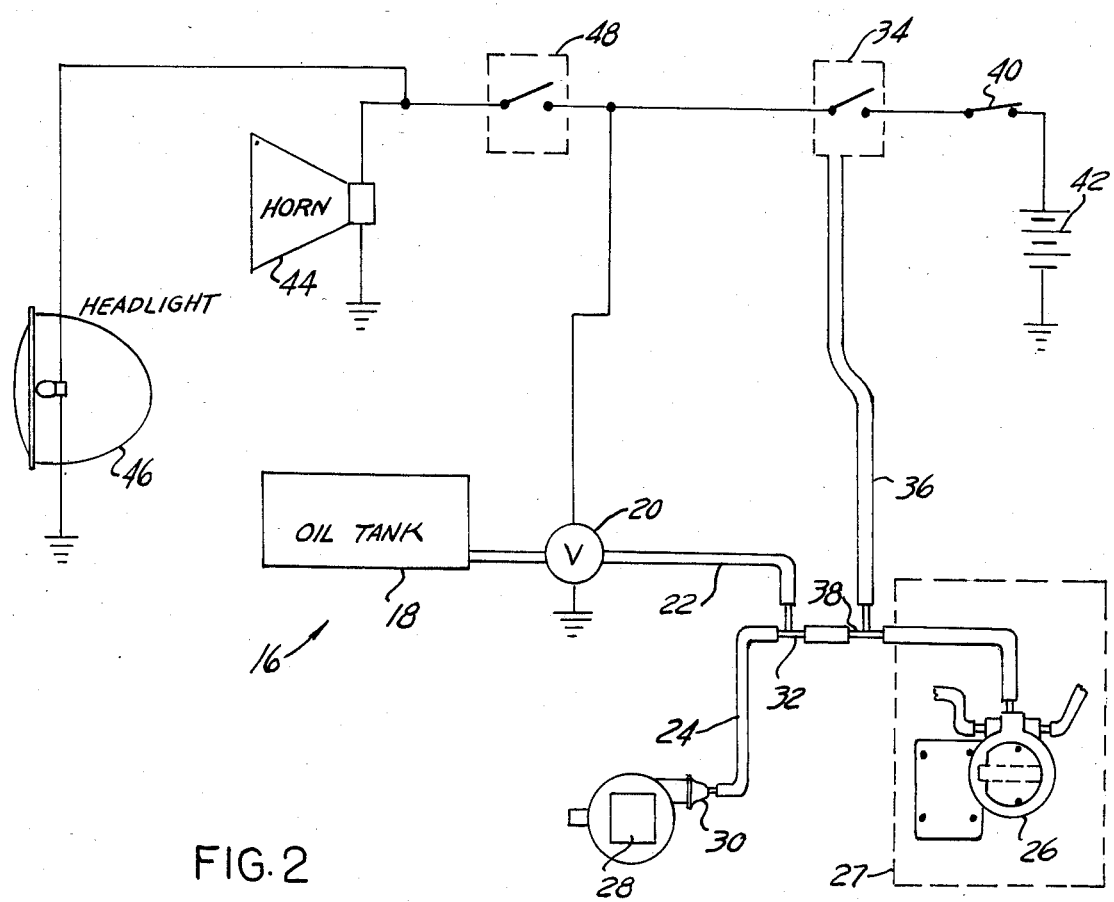
FIG. 2 is a schematic of the arrangement of components of the present invention.

The theft deterrent device 16, schematically illustrated at FIG. 2, comprises a tank 18 installed, for example, under the hood of the motor vehicle 10, and connected through a solenoid operated valve 20 via a line 22 to one of the engine carburetor vacuum or suction lines. For example, the line 22 is connected to the vacuum or suction line 24 between the carburetor 26 of the motor vehicle engine 27 and the engine ignition distributor 28 which, as is well known in the art, is provided with a vacuum control 30 modifying the ignition advance as a function of the engine load. The line 24 takes the form of a flexible hose, commonly referred to as the spark vacuum hose. The only modification required for installing the device 16 of the invention in a motor vehicle consists in cutting the spark vacuum hose 24, for example, or any other vacuum hose leading to the carburetor 26, and reconnecting the two halves of the spark vacuum hose 24 with a T-connector 32, allowing the line 22 to be connected to the spark vacuum hose 24 through the T-connector 32.

A vacuum operated switch 34 is connected, via a line 36 to, for example, the spark vacuum hose 24 by means of a T-connector 38. It will be readily appreciated that the vacuum operated switch 34 may be connected to another vacuum line to the carburetor 26, or a double T-connector may be used for joining the two halves of the spark vacuum hose 24 and for connection of the spark vacuum hose 24 to both the line 22 downstream of the solenoid operated valve 20 and to the line 36 connected to the vacuum operated switch 34.

The vacuum operated switch 34 is connected, through a hidden switch 40, to the +, or "hot", terminal of the motor vehicle battery 42. The hidden switch 40 may be placed in any location under or behind the instrument panel, or in any other location out of immediate view, the location of the hidden switch 40 being known only to the lawful operator of the motor vehicle. The hidden switch 40 may be an ordinary toggle switch, or it may be a key operated switch.

Upon unauthorized start-up of the engine 27, while the hidden switch 40 is closed, as soon as the carburetor 26 draws vacuum through the spark vacuum hose 24, the vacuum operated switch 34 is closed, thus energizing the solenoid operated valve 20 which places the tank 18 in communication, via the line 22, with the spark vacuum hose 24. The tank 18 is normally filled with, for example, lubricating or mineral oil, or, in the alternative, with an oily liquid fluid containing appropriate color pigments. The oil, or other fluid, being drawn from the tank 18 to the spark vacuum hose 24 is sucked into the carburetor 26 and into the engine intake. The burnt and vaporized oil thus produces the heavy cloud of smoke 12 at the outlet of the exhaust pipe 14, FIG. 1 and, by using appropriate color pigments in the oil or oily fluid, the cloud of smoke 12 is appropriately colored. A telltale signal is thus provided, attracting the attention of bystanders upon the unauthorized use of the vehicle.

In addition, the excess oil or other oily fluid being introduced into the engine combustion chamber tends to progressively foul up the engine spark plugs, thus causing misfiring and excessive vibration of the engine, all tending to discourage an attempted theft, with the result that the would-be thief is encouraged to abandon the motor vehicle.

Restoration of the vehicle to normal functioning is simply effected by opening the hidden switch 40 and running up the engine such as to clear the fouled up spark plugs.

Operation of the device 16 of the present invention for providing a telltale cloud of smoke is not seriously affected by the presence of an electrolytic converter in the exhaust system of the motor vehicle. However prolonged operation with excess burnt and unburnt oil being ingested by the catalytic converter may eventually cause malfunction of the converter. As catalytic converters are designed to literally choke the exhaust of the associated engine upon malfunction of the converter, malfunction of the converter caused through the use of the device 16 of the invention increases the chances of discouraging a thief.

The appearance of heavy smoke at the exhaust pipe outlet and the apparent malfunction of the engine may, in addition and if so desired, be accompanied by intermittent blaring of the motor vehicle horn 44, and/or of the motor vehicle headlights 46 as a result of connecting the horn 44 and/or the headlights 46 through a make and break switch, such as a bimetal switch 48, to the battery 42 through the vacuum operated switch 34 and the hidden switch 40, as shown at FIG. 2.

It will be appreciated by those skilled in the art that the line 22 may be connected, together with the line 36 connected to the vacuum or suction operated switch 34, to any portion of the intake of an internal combustion engine such as, for example, directly to the inlet manifold. Such an installation is generally appropriate for motor vehicles provided with a compression ignition engine, or Diesel engine. In motor vehicles equipped with a direct injection gasoline engine, the lines 22 and 36 may be connected to the inlet manifold or to any suction line into the air inlet throttling device replacing the conventional carburetor. In compression ignition engines, the excess of oil or oily fluid also causes a dark cloud of smoke to be produced at the tailpipe outlet, and the excessively rich charge into the engine combustion chambers causes abnormal or intermittent functioning of the engine, accompanied by incorrect firing timing, pre-ignition and like problems.

Having thus described the present invention by way of an example of structure, given for illustrative purpose only, well designed to accomplish the objects of the invention, modification whereof will be apparent to those skilled in the art, what is claimed as new is as follows:

1. A motor vehicle theft deterrent device for a motor vehicle provided with a battery and an internal combustion engine having an inlet and an exhaust, said device comprising a tank containing an oily liquid fluid, a line connecting said tank to the motor vehicle engine intake, a solenoid operated valve in series in said line, a vacuum operated switch for operating said valve, said vacuum operated switch being connected for operation to said engine intake, and a hidden switch in series between said motor vehicle battery and said vacuum operated switch, whereby upon unauthorized operation of said motor vehicle engine with said hidden switch closed said vacuum operated switch opens said valve allowing flow of said oily fluid into said intake for creating smoke in the exhaust of said engine.

2. The motor vehicle theft deterrent device of claim 1 wherein said motor vehicle engine has a carburetor, and said line is connected to a vacuum line leading into the carburetor.

3. The motor vehicle theft deterrent device of claim 1 wherein said oily fluid contains at least one color pigment to provide colored smoke at the exhaust.

4. The motor vehicle theft deterrent device of claim 2 wherein said oily fluid contains at least one color pigment to provide colored smoke at the exhaust.

5. The motor vehicle theft deterrent device of claim 1 further comprising a make and break switch connected to said hidden switch and to a horn for intermittent operation of said horn.

6. The motor vehicle theft deterrent device of claim 2 further comprising a make and break switch connected to said hidden switch and to a horn for intermittent operation of said horn.

7. The motor vehicle theft deterrent device of claim 3 further comprising a make and break switch connected to said hidden switch and to a horn for intermittent operation of said horn.

8. The motor vehicle theft deterrent device of claim 4 further comprising a make and break switch connected to said hidden switch and to a horn for intermittent operation of said horn.

9. The motor vehicle theft deterrent device of claim 1 wherein said motor vehicle is provided with a headlight and further comprising a make and break switch connected to said hidden switch and to said headlight for intermittent operation of said headlight.

10. The motor vehicle deterrent device of claim 2 wherein said motor vehicle is provided with a headlight and further comprising a make and break switch connected to said hidden switch and to said headlight for intermittent operation of said headlight.

11. The motor vehicle theft deterrent device of claim 3 wherein said motor vehicle is provided with a headlight and further comprising a make and break switch connected to said hidden switch and to said headlight for intermittent operation of said headlight.

12. The motor vehicle theft deterrent device of claim 4 wherein said motor vehicle is provided with a headlight and further comprising a make and break switch connected to said hidden switch and to said headlight for intermittent operation of said headlight.

13. The motor vehicle theft deterrent device of claim 5 wherein said motor vehicle is provided with a headlight and said headlight is connected through said make and break switch to said hidden switch for intermittent operation of said headlight.

14. The motor vehicle theft deterrent device of claim 6 wherein said motor vehicle is provided with a headlight and said headlight is connected through said make and break switch to said hidden switch for intermittent operation of said headlight.

15. The motor vehicle theft deterrent device of claim 7 wherein said motor vehicle is provided with a headlight and said headlight is connected through said make and break switch to said hidden switch for intermittent operation of said headlight.

16. The motor vehicle theft deterrent device of claim 8 wherein said motor vehicle is provided with a headlight and said headlight is connected through said make and break switch to said hidden switch for intermittent operation of said headlight.

* * * * *